United States Patent
Wickman et al.

(10) Patent No.: US 11,613,481 B2
(45) Date of Patent: Mar. 28, 2023

(54) METHOD FOR PURIFICATION OF AN AQUEOUS SOLUTION

(71) Applicant: ATIUM AB, Gothenburg (SE)

(72) Inventors: Björn Wickman, Floda (SE); Cristian Tunsu, Askim (SE)

(73) Assignee: ATIUM AB, Gothenburg (SE)

(*) Notice: Subject to any disclaimer, the term of this patent is extended or adjusted under 35 U.S.C. 154(b) by 350 days.

(21) Appl. No.: 16/758,448

(22) PCT Filed: Oct. 29, 2018

(86) PCT No.: PCT/EP2018/079592
§ 371 (c)(1),
(2) Date: Apr. 23, 2020

(87) PCT Pub. No.: WO2019/086387
PCT Pub. Date: May 9, 2019

(65) Prior Publication Data
US 2020/0339445 A1    Oct. 29, 2020

(30) Foreign Application Priority Data
Oct. 30, 2017 (EP) .................................. 17199244

(51) Int. Cl.
*C25D 3/00* (2006.01)
*C02F 1/467* (2023.01)
(Continued)

(52) U.S. Cl.
CPC .. *C02F 1/4678* (2013.01); *C02F 2001/46138* (2013.01); *C02F 2101/20* (2013.01);
(Continued)

(58) Field of Classification Search
CPC .......... C02F 1/4678; C02F 2001/46138; C02F 2101/20; C02F 2201/46135; C02F 2201/4614; C02F 2209/06
See application file for complete search history.

(56) References Cited

U.S. PATENT DOCUMENTS 3,804,733 A * 4/1974 Bennion .................. C25C 1/12
                                                          204/539
3,899,405 A    8/1975 Iverson et al.
(Continued)

OTHER PUBLICATIONS

Rodnei Bertazzoli et al., "Electrolytic removal of metals using a flow-through cell with a reticulated vitreous carbon cathode", Journal of the Brazilian Chemical Society, São Paulo; BR, (19960723), vol. 8, No. 5, doi:10.1590/S0103-50531997000500009, ISSN 0103-5053, pp. 487-493, XP055436188 [A] 1-15.

*Primary Examiner* — Zulmariam Mendez
(74) *Attorney, Agent, or Firm* — Duane Morris LLP; Gregory M. Lefkowitz; Brandon A. Chan

(57) ABSTRACT

The present invention relates to a method for electrochemical purification of an aqueous solution comprising the steps of: providing a cathode and an anode to an aqueous solution, wherein said aqueous solution comprises soluble ions of at least one toxic heavy metal and wherein said cathode comprises an outer surface, which outer surface comprises a noble metal; applying an absolute potential to said cathode and wherein said absolute potential of said cathode drives the formation of an alloy comprising said noble metal and said at least one toxic heavy metal.

20 Claims, 9 Drawing Sheets

(51) Int. Cl.
 *C02F 1/461* (2023.01)
 *C02F 101/20* (2006.01)
(52) U.S. Cl.
 CPC ............ *C02F 2201/4614* (2013.01); *C02F 2201/46135* (2013.01); *C02F 2209/06* (2013.01)

(56) References Cited

U.S. PATENT DOCUMENTS

| | | |
|---|---|---|
| 4,436,601 A | 3/1984 | Branchick et al. |
| 5,292,412 A | 3/1994 | Pitton |
| 2007/0142693 A1 | 6/2007 | Adachi et al. |
| 2018/0346353 A1* | 12/2018 | Hu ................... C02F 1/4676 |

* cited by examiner

METHOD FOR PURIFICATION OF AN AQUEOUS SOLUTION

CROSS-REFERENCE TO RELATED APPLICATIONS

This application is a § 371 national stage entry of International Application No. PCT/EP2018/079592, filed Oct. 29, 2018, which claims priority of European National Application No. 17199244.9, filed Oct. 30, 2017, the entire contents of which are incorporated herein by reference.

TECHNICAL FIELD OF THE INVENTION

The present invention refers to a method for purification of an aqueous solution and use of a method for purification of an aqueous solution.

BACKGROUND OF THE INVENTION

Economic growth and industrialization have provided access to better technologies and increased life standards but, at the same time, have raised certain major environmental concerns. Excessive mining and processing of natural resources, emissions of harmful substances and environmental pollution, and future access to clean water are just a few of the issues man-kind should address to reach a sustainable society.

Emissions of toxic heavy metals by various industries have followed the industrial revolution and have been extensively discussed in the past decades, and are of major concern. The main problems are related to mobility and spread of toxic heavy metals in the environment, and their uptake by living organisms. Mercury, arsenic, cadmium, and lead are emitted in the atmosphere and can be washed by precipitation and deposit on vegetation and soil. From here, these species can infiltrate the ground water and, subsequently, other water streams and finally be taken up by living organisms.

Constant efforts have, and are being carried out to minimize the spread of toxic heavy metals in the environment. This is done by employing cleaner and/or alternative processes, trapping the harmful substances to prevent their release in the environment, chemical conversion to more stable and/or less toxic species, etc. Despite this, toxic heavy metal pollution remains a serious problem, especially in countries without tight emissions legislation or without access to modern processing technology.

Current solutions to reduce the toxic heavy metal levels in aqueous solutions, such as aqueous feeds or compositions, include precipitation, flocculation, absorption (e.g. on activated charcoal), ion exchange, and solvent extraction. These solutions have limitations in e.g. how large volumes which may be successfully treated. A further limitation with the current state of the art is that several of these methods require addition of chemicals in the stream to facilitate decontamination, i.e. for purification of the aqueous solution. Yet further limitations are relating to the efficiency and/or selectivity of the current methods for purification of water by removal of toxic heavy metals. Therefore, there is a need to improve the current state of the art.

SUMMARY OF THE INVENTION

It is an object of the present invention to improve the current state of the art and to mitigate at least some of the above mentioned problems. These and other objects are achieved by a method for purification of an aqueous solution according to the accompanying independent claims.

According to a first aspect of the invention a method for electrochemical purification of an aqueous solution is provided. The method comprises the steps of:
providing a cathode and an anode to an aqueous solution, wherein said aqueous solution comprises soluble ions of at least one toxic heavy metal and wherein said cathode comprises an outer surface, which outer surface comprises a noble metal;
applying an absolute potential to said cathode;
wherein said absolute potential of said cathode drives the formation of an alloy comprising said noble metal and said at least one toxic heavy metal.

The present invention is based on the realization that when applying an absolute potential to a cathode having an outer surface comprising a noble metal the absolute potential may drive the formation of an alloy comprising a toxic heavy metal of which ions are present in an aqueous solution to which said cathode is provided. Upon formation of said alloy, the number of ions of said toxic heavy metal decrease in the aqueous solution. The decrease in the number of ions of said toxic heavy metal may be used for purification of the aqueous solution. Alternatively, the decrease in the number of ions of a toxic heavy metal may be used to keep the concentration of ions of a toxic heavy metal constant in an aqueous solution or to limit the rate by which the concentration of ions of a toxic heavy metal increases in an aqueous solution. In absence of an applied absolute potential no or very little formation of the alloy is noticed.

Further, the method as described herein allows for thick layers of alloy, which may partially cover the outer surface of said cathode, to form, e.g. thicker layers than a few monolayers or it allows for an inclusion of ions corresponding to more than a few monolayers.

According to at least one example embodiment of the invention, said alloy forms as an alloy layer which partially covers said outer surface of said cathode. It may be understood that the wording "which alloy layer at least partially covers said outer surface of said cathode" means that the layer of the alloy may not cover the complete outer surface of said cathode.

Additionally, or alternatively, said alloy forms inside or diffuses inside of said noble metal.

It should be understood that the term alloy does within this context refer to alloys having both a specific crystalline structure, i.e. a crystalline structure where it is given which atom that sits on a certain position, or a non-specific crystalline structure, e.g. a solid solution. Further, the term alloy may also refer to crystalline mixtures. Stated differently, an alloy having a specific crystalline structure, a solid solution or a crystalline mixture comprising said noble metal and said at least one heavy metal are henceforth referred to as an alloy. A solid solution alloy may be more stable than an alloy having a specific crystal structure.

According to at least one example embodiment of the invention, the step of applying an absolute potential to said cathode is done by creating a potential difference between said anode and said cathode.

According to at least one example embodiment of the invention, during the step of applying an absolute potential, electrons from said cathode may be transferred to said ions of at least one toxic heavy metal such that said ions of said at least one toxic heavy metal are reduced. As a consequence of the reduction, the alloy may form. Simultaneously, the anode is used to balance the charges in said aqueous solution, i.e. in the electrolyte of such system. The charges may be balanced by carrying out as many oxidation steps on the anode as reduction steps on the cathode. The oxidation steps on the anode may for example comprise oxidization of water. Upon oxidization of water, $H^+$ and $O_2$ are formed. Alternatively, the charges may be balanced by using a sacrificial electrode as the anode, such sacrificial electrode may comprise carbon, e.g. in the form of graphite. In such case, carbon comprising compounds, for example carbon dioxide and carbon oxide, may be formed at the anode.

Stated differently, when applying an absolute potential to said cathode, the ions of said at least one toxic heavy metal is reduced at said cathode. Simultaneously, oxidation reactions occur at said anode such that the charges of said solution are balanced.

According to at least one example embodiment of the invention, said aqueous solution may be an aqueous solution of a natural or anthropogenic origin. Here, it may be understood that an aqueous solution of a natural origin is for example a lake, or a river, or any other water reservoir or water stream not originating from a human activity. Further, it may here be understood that an aqueous solution with an anthropogenic origin is an aqueous solution, e.g. a water reservoir or water stream, which originates from a human activity e.g. an industrial waste water, or a sewage, or a pond. For example, the aqueous solution chosen but not limited to the following examples: natural water, industrial waste water, sewage, water originating from or passing through a contaminated or an industrial site (i.e. a run-off stream from a contaminated or an industrial site), potable water, and/or household water. Stated differently, the aqueous solution may be a natural or an artificial water source.

According to at least one example embodiment of the invention, the outer surface of said cathode may comprise an activable portion. The activable portion may also be referred to as an activable portion. The activable portion is a portion of the cathode which may be active when in use. Hence, the activable portion is a portion which may be activated in the step of applying said absolute potential to said cathode. Stated differently, the activable portion may comprises said noble metal and hence may the activable portion play an active part in the formation of the alloy. Upon formation, the alloy may cover or at least partially cover the activable portion of said cathode and/or the alloy may be formed inside or it may diffuse inside said cathode.

According to at least one example embodiment, the activable portion may constitute 5-100% of said outer surface, or it may constitute 10-90% of said outer surface, or it may constitute 20-70% of said outer surface.

According to at least one example embodiment of the invention, the activable portion may have sufficiently large surface area. A larger surface area of the activable portion may make the purification faster. For industrial processing, the cathodes can be designed to have significantly large activable portion, e.g. packed bed columns or porous constructions.

According to at least one example embodiment, the outer surface may further comprise a non-activable portion. The non-activable portion is not active when the cathode is in use. Further, the non-activable portion may not comprise a noble metal.

It may be understood that the term "drives the formation of an alloy" may be interpreted as "enable the formation of an alloy". Stated differently, the alloy may be formed due to the absolute potential being applied to the cathode. Further, the term "drives the formation on an alloy" may also be interpreted as the alloy becomes more thermodynamically stable under the applied potential.

According to at least one example embodiment of the invention, the method may be used in batch-wise process, in a semi-batch-wise process or in a continuous process.

According to at least one example embodiment of the invention, the step of applying an absolute potential to said cathode may last until a predetermined or desired concentration of said ions of at least one toxic heavy metal in the aqueous solution is achieved and/or until a predetermined or desired amount of toxic heavy metals has been removed from the aqueous solution. This may take seconds, or minutes, or days or weeks depending on various parameters. For example, it may depend on the starting concentration of the ions of the at least one toxic heavy metal, or the volume of the aqueous solution, or the size of the activable portion of the outer surface of the cathode, and/or the total amount of activable noble metal.

Additionally, or alternatively, the step of applying an absolute potential to said cathode may last until a majority of the ions of the at least one toxic heavy metal which are present prior to this step are converted into said alloy. It should be understood that a majority is more than 51% of said ions, or more than 60% of said ions, or more than 70% of said ions, or more than 80% of said ions, or more than 90% of said ions, or more than 95% of said ions. In a specific example of the invention, 100% of said ions of said at least one toxic heavy metal present in the aqueous solution prior to the step of applying an absolute potential to said cathode are converted to an alloy during the step of applying an absolute potential to said cathode.

According to at least one example embodiment of the invention, the cathode may comprise a porous material. In such an embodiment the noble metal comprised in the outer surface of said cathode may cover the porous substrate or it may be embedded in the porous material such that the porous material also is comprised in said outer surface.

According to at least one example embodiment the cathode may solely comprise said noble metal.

According to at least one example embodiment of the invention, the alloy formed on said cathode may be used to detect and/or measure the presence of a toxic heavy metal in an aqueous solution. Stated differently, the method as described herein may be used to detect and/or measure the presence of a toxic heavy metal in an aqueous solution. For example, the method may be used to detect and/or measure the presence of a toxic heavy metal in for example a lake, a river, an industrial waste stream, water originating from or passing through a contaminated or an industrial site (i.e. a run-off stream from a contaminated or an industrial site), a sewage, or in potable water.

According to at least one example embodiment of the invention, the step of applying an absolute potential to said cathode may be done by providing a predetermined potential between said cathode and said anode or by providing a predetermined current to said cathode and said anode. When providing a predetermined voltage between said cathode and said anode, the current may not be controlled. Stated differently, according to at least one example embodiment of the invention, said aqueous solution is purified by voltammetry. When providing a predetermined current, the potential between said cathode and said anode may not be controlled. Stated differently, according to at least another example embodiment, said aqueous solution is purified by amperometry.

According to at least one example embodiment of the invention, said outer surface comprises said noble metal in the form of a continuous layer or in the form of particles.

According to at least one example embodiment of the invention, the particles may have at least one extension in the range of 1 nm-1 cm. According to at least one example embodiment, the particles may be referred to as nanoparticles and/or microparticles. In such an embodiment the particles may at least one extension in the range of 1 nm-100 µm. The particles may for example have at least one extension which is 10 nm, or 50 nm, or 100 nm, or 500 nm, or 1 µm, or 50 µm.

According to at least one example embodiment of the invention, the outer surface may comprise the noble metal in the form of particles. Particles provides a large surface area, which allows for a more effective formation of the alloy. In such an embodiment, the alloy may form on the surface of said particles. Further, nanoparticles of a noble metal may typically be easier to fabricate than a continuous layer of said noble metal. According to at least one example embodiment of the invention, the particles of said noble metal may be embedded in a porous substrate.

It should be understood that the term "toxic heavy metal" refers to any metal with a density above 3.5 g/cm$^3$ and which have a negative effect or a negative impact on the environment and/or on living organisms. According to at least one embodiment of the invention, the toxic heavy metal may be chosen from a list comprising but not limited to: mercury, arsenic, cadmium, zinc, chrome and lead. In a preferred embodiment, the toxic heavy metal is one of mercury, arsenic, cadmium and lead.

According to at least one example embodiment of the invention said soluble ions of at least one toxic heavy metal are soluble ions of mercury. Forming an alloy comprising mercury allows for successful collection of said mercury on said cathode.

According to at least one example embodiment of the invention, the noble metal which at least partially covers the cathode is ruthenium (Ru), rhodium (Rh), palladium (Pd), silver (Ag), osmium (Os), iridium (Ir), platinum (Pt), copper (Cu), rhenium (Re), or gold (Au). Stated differently, it should be understood that the term "noble metal" refers to any of the following metals: ruthenium (Ru), rhodium (Rh), palladium (Pd), silver (Ag), osmium (Os), iridium (Ir), platinum (Pt), copper (Cu), rhenium (Re), or gold (Au) or a combination thereof. The preferred noble metals, in the context of at least one embodiment of the invention, is platinum, gold, silver, copper or palladium or a combination thereof.

Mercury (Hg) is not mentioned as one noble metal herein since it is not practical to have a cathode comprising mercury. Mercury is normally a liquid at room temperature which makes it a challenge to provide a long-term stable cathode comprising an outer surface comprising mercury.

According to at least one example embodiment of the invention said noble metal is platinum. In other words, the most preferred metal according to at least one embodiment of the invention is platinum.

According to at least one example embodiment of the invention, the alloy may be written on a general form as AaBb where the A is the noble metal and B is the toxic heavy metal. The small letters, a and b, are numbers which can take values between 1-9, not limited to whole numbers. Additionally, or alternatively multiple component alloys, solid solutions and/or crystalline mixtures may also form, e.g. $A_aB_bC_c$, $A_aB_bC_cD_d$, $A_aB_bC_cD_dE_e$ etc., where A is the noble metal and B, C, D, E etc. are toxic heavy metals and non-heavy metals. The small letters can take values from 0-9, not limited to whole numbers, and a always takes a value >0.

In embodiments where the ions of at least one toxic heavy metal is ions of mercury and where the noble metal of the outer surface of the cathode is platinum, the three alloy phases that are most favorable to form are PtHg, $PtHg_2$ and $PtHg_4$, wherein the last one is most thermodynamically favored to form. Since, $PtHg_4$ is most thermodynamically favored, it is most likely this alloy that may be formed upon applying an absolute potential to said cathode. Hence, according to at least one example embodiment of the invention, upon the step of applying an absolute potential to said cathode $PtHg_4$ may be formed. $PtHg_4$ is stable thermodynamically, having a negative enthalpy of formation, and this will stabilize mercury and thereby preventing its dissolution. By applying a potential, the $PtHg_4$ is further stabilized and this may make Hg dissolution more unfavorable, Hence, during the step of applying an absolute potential to said cathode, said alloys are stabilized.

In alternative embodiments of the invention, when the toxic heavy metal and/or the noble metal being different other alloys may be formed. For example, if the noble metal is gold and the toxic heavy metal is mercury, $Au_2Hg$, or $Au_2Hg_5$, or $Au_3Hg$, or $Au_3Hg_2$, or AuHg may be formed. In embodiments, where the noble metal is copper and the toxic heavy metal is mercury, $Cu_7Hg_6$ may be formed. In embodiments, where the noble metal is gold and the toxic heavy metal is cadmium, $Au_3Cd$, $Au_2Cd$, $Au_5Cd_8$, $Au_3Cd_5$, AuCd, $AuCd_2$, $AuCd_3$, $AuCd_4$ may be formed.

According to at least one example embodiment of the invention, the method further comprises a further step:
providing a reference electrode;
wherein said reference electrode is used to control said absolute potential of said cathode.

By using a reference electrode, the absolute potential applied to said cathode may be controlled, e.g. to keep the absolute potential of said cathode at a constant level, and thereby is the reference electrode used to control the alloy formation. The reference electrode may for example be calomel ($Hg/Hg_2Cl_2$), silver-silver chloride (Ag/AgCl), mercury-mercury oxide (Hg/HgO), mercury-mercurous sulfate ($Hg/Hg_2SO_4$), silver-silver sulfate ($Ag/Ag_2SO_4$) or copper-copper sulfate ($Cu/CuSO_4$). The reference electrode may be compatible with the environment, i.e. the equilibrium of the reference electrode should be stable and should not be affected by the electrolyte or the dissolved species in the electrolyte.

According to at least one example embodiment of the invention, said absolute potential of said cathode is within the range of −1-1.5 V vs. RHE, or within the range of 0-1 V vs. RHE. RHE is here short for reversible hydrogen electrode. When relating the absolute potential to RHE (vs. RHE) the absolute potential is given in relation to the potential at which the hydrogen oxidation reaction and hydrogen evolution reaction are at equilibrium on Pt, i.e. below 0 V vs. RHE, protons will be reduced to hydrogen and above 0 V vs. RHE hydrogen will be oxidized to protons on a Pt electrode.

It shall be understood that the absolute potential is here given vs. RHE which is due to practical reasons. The absolute potential may also be given on another potential scale. For example, the potential may be given vs. SHE. SHE is here short for Standard Hydrogen Electrode. This refers to the potential at which hydrogen is produced on a Pt-electrode in a theoretical, ideal solution at pH=0. Stated differently, at pH=0 a potential vs. RHE and vs. SHE are virtually the same. In general, the following relation between the two scales of potential apply: V_RHE=V_SHE+0.059*pH. The potential may also be given vs. NHE. NHE is short for normal hydrogen electrode and refers to a practical solution at pH=0. At pH=0, a potential vs. RHE, vs. SHE and vs. NHE is virtually the same. At other pH-values an absolute potential given vs. SHE and vs. NHE is the same.

According to at least one example embodiment of the invention, said formation of an alloy is selective.

According to at least one example embodiment of the invention, the formation of an alloy occurs in the presence of other metal ions, wherein the metal ions may be ions of both heavy and "non-heavy" metals. Stated differently, formation of an alloy upon applying an absolute potential to said cathode is selective in that sense that the alloy is formed even though there are other metal ions present in the aqueous solution. Selective may be understood as that the desired alloy(s) is formed upon applying an absolute potential to said cathode. Stated differently, selective should be understood as it is possible to form an alloy or alloys only between the cathode and a certain toxic heavy metal, even if there are other types of metal ions present in the aqueous solution.

According to at least one example embodiment of the invention, said alloy layer has a thickness within the range of 1 nm to 1 cm, or within in the range of 1 nm to 1 mm.

The method as presented here in allows for growing a relatively thick alloy layer, i.e. an alloy layer thicker than a couple of monolayers. The alloy layer may for example be thicker than $10^{-9}$ m, or thicker than $10^{-8}$ m, or thicker than $10^{-7}$ m, or thicker than $10^{-6}$ m, or thicker than $10^{-5}$ m, or thicker than $10^{-4}$ m or thicker than $10^{-3}$ m. Additionally, or alternatively, the alloy layer may be no thicker than $10^{-2}$ m, or no thicker than $10^{-3}$ m, or no thicker than $10^{-4}$ m, or no thicker than $10^{-5}$ m. For example, the alloy layer may be within the range from $10^{-9}$ m to $10^{-2}$ m, or within the range from $10^{-5}$ m to $10^{4}$ m, or within the range from $10^{-7}$ m to $10^{-4}$ m.

According to at least one example embodiment of the invention, said aqueous solution has a pH within the range of -1-14, or within the range of -1-10, or within the range of -1-7.

According to at least one example embodiment, the aqueous solution may have a pH above -1, above 0, or above 2, or above 4, or, above 5, or above 6. Additionally, or alternatively, the aqueous solution has a pH no higher than 14, or no higher than 12, or no higher than 10, or no higher than 8, or no higher than 7, or no higher than 6. For example, the aqueous solution may have a pH within the range from 0 to 10, or from 2 to 8, or from 1 to 8.

According to at least one example embodiment the aqueous solution has a natural pH, i.e. the aqueous solution may have a pH around 7. This is advantageous since the method may work without changing the pH of the aqueous solution prior of using the method as described herein.

According to at least one example embodiment of the invention, a concentration of said ions of at least one toxic heavy metal in said water solution is within the range of 0.001 mg/L-1000 mg/L, or within the range of 0.001 mg-500 mg, or within the range of 0.01 mg-100 mg. For example, the concentration of said ions of said toxic heavy metal may for example be 0.0005 mg/L, or 0.0015 mg/L, or 0.15 mg/L, or 1.5 mg/L, or 15 mg/L, or 150 mg/L, or 300 mg/L, or 700 mg/L.

An advantage with the method according to the first aspect of the invention is that the method may be used for purification of aqueous solution having a relatively low concentration of ions of said toxic heavy metal.

According to at least one example embodiment of the invention, said method further comprises a step: regenerating said noble metal and/or said toxic heavy metal.

According to at least one example embodiment of the invention, the noble metal may be regenerated and/or the toxic heavy metal may be regenerated by a variety of methods. For example, the noble metal and/or the toxic heavy metal may for example be regenerated by reversing the absolute potential of said cathode. Additionally, or alternatively, the noble metal and/or the toxic heavy metal may be regenerated by thermal methods, where the heavy metal and the noble metal is recovered by heating the alloy to facilitate the decomposition of the alloy at higher temperature, e.g. a temperature above 600° C. When heating a cathode comprising e.g. $PtHg_4$ the alloy may be converted to elemental mercury and metallic platinum. The elemental mercury is volatile at higher temperatures.

It should be understood that, during the step of regenerating said noble metal and/or said toxic heavy metal the noble metal and/or the toxic heavy metal may be regenerated e.g. by decomposition of said alloy.

According to a second aspect of the invention, use of a method for electrochemical purification of an aqueous solution according to the first aspect of the invention is provided, wherein the method is used for electrochemical purification of an aqueous solution comprising soluble ions of at least one toxic heavy metal and wherein said aqueous solution is artificial aqueous solution or a natural aqueous solution e.g. groundwater, a lake or a river.

Effects and features of this second aspect of the present invention are largely analogous to those described above in connection with the first aspect of the invention. Embodiments mentioned in relation to the first aspect of the present invention are largely compatible with the second aspect of the invention.

According to at least one example embodiment of the invention, said ions at least one toxic heavy metal comes from an anthropogenic source or from a natural source. Hence, the ions of at least one toxic heavy metal may come from both man-made and natural pollution of aqueous streams. With natural pollution may for example be a volcanic eruption which may cause addition of ions of at least one toxic heavy metal to an aqueous stream.

According to at least one example embodiment of the invention, the natural aqueous solution may for example be a lake, ground water or a river.

According to at least one example embodiment, said artificial aqueous solution may for example be a sewage, or industrial waste water, or water originating from or passing through a contaminated or industrial site.

Stated differently, the electrochemical purification of the method according to the first aspect of the invention is electrochemical purification of an artificial aqueous solution or a natural aqueous solution.

According to at least one example embodiment of the invention, said aqueous solution is industrial waste water.

Stated differently, the electrochemical purification of the method according to the first aspect of the invention is electrochemical purification of industrial waste water.

According to at least one example embodiment of the invention, said aqueous solution is a sewage.

Stated differently, the electrochemical purification of the method according to the first aspect of the invention is electrochemical purification of sewage.

According to at least one example embodiment of the invention, said aqueous solution is potable water and/or household water.

Stated differently, the electrochemical purification of the method according to the first aspect of the invention is electrochemical purification of potable water and/or household water.

BRIEF DESCRIPTION OF THE DRAWINGS

The above objects, as well as additional objects, features and advantages of the present invention, will be more fully appreciated by reference to the following illustrative and non-limiting detailed description of embodiments of the present invention, when taken in conjunction with the accompanying drawings, wherein.

DETAILED DESCRIPTION OF THE DRAWINGS

In the following, embodiments of the present invention will be discussed with reference to the accompanying figures. It should be noted that this detailed description by no means limits the scope of the invention. The scope of the invention is defined by the appended claims. Further, that specific features are mentioned in connection to an embodiment of the invention does not mean that those features cannot be used to an advantage together with other embodiments of the invention.

Figure 1:
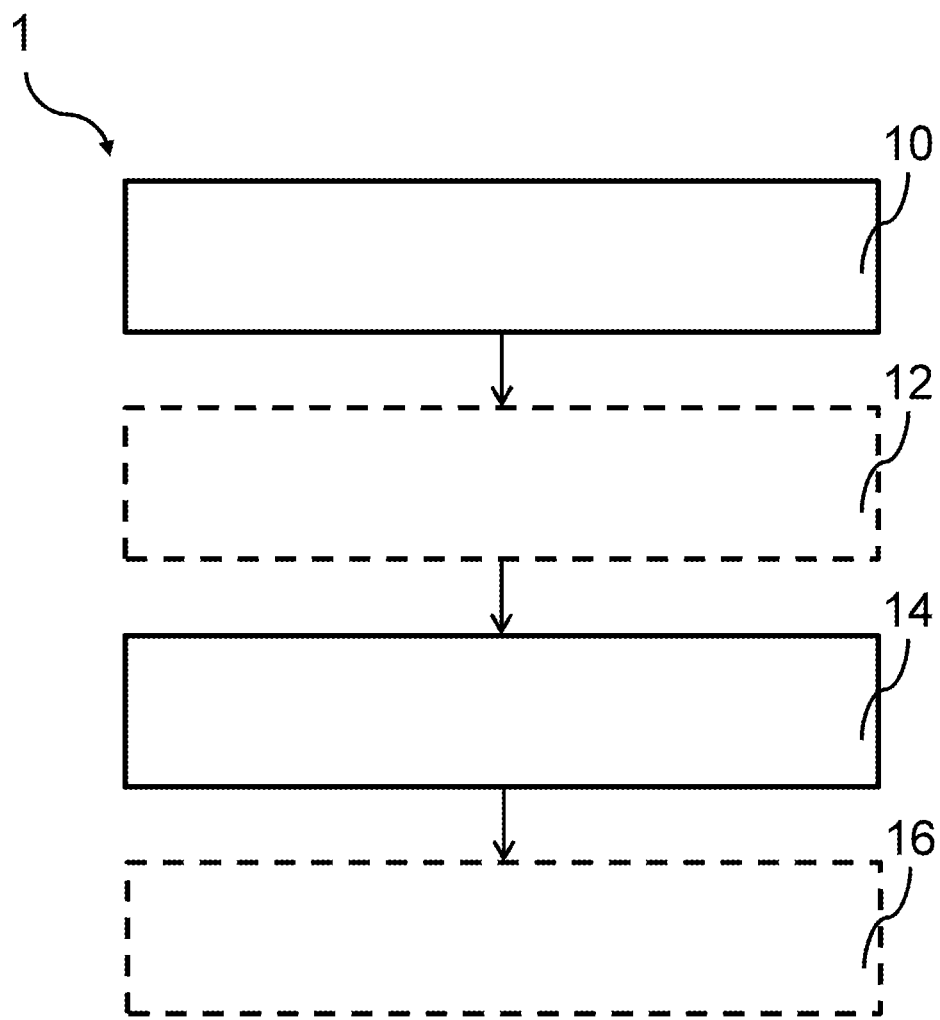
FIG. 1 shows a schematic view of a method for electrochemical purification of an aqueous solution in accordance with at least one embodiment of the invention.

FIG. 1 shows a schematic view of a method for electrochemical purification of an aqueous solution 1. The method comprises the steps of providing a cathode and an anode to an aqueous solution 10 and applying an absolute potential to said cathode 14. The absolute potential applied to said cathode drives the formation of an alloy comprising a noble metal comprised in an outer surface of said cathode and a toxic heavy metal of which ions are present in the aqueous solution prior to the step of providing a cathode and an anode to an aqueous solution 10. Upon alloy formation, the number of ions of the toxic heavy metal decreases and thereby this method may be used for purification of said aqueous solution.

In the embodiment explained in connection to FIG. 1, the outer surface of a cathode comprises platinum and the aqueous solution comprises ions of mercury. In the step of applying an absolute potential to said cathode 14, the absolute potential drives the formation of platinum-mercury alloys, namely PtHg, $PtHg_2$ and $PtHg_4$.

The method for purification of an aqueous solution may further comprise two optional steps 12,16. In FIG. 1 they are visualized as dashed boxes. The two optional steps 12,16 are (i) providing a reference electrode 12 and (ii) regenerating said noble metal and/or said toxic heavy metal 16. The step of providing a reference electrode to said aqueous solution is typically occurring prior to the step applying an absolute potential to the cathode 14. Further, the step of providing a reference electrode to said aqueous solution 12 may occur prior or after the step of providing a cathode and an anode to an aqueous solution 10. Alternatively, the step of providing a reference electrode to the aqueous solution 12 may occur simultaneously to the step of providing a cathode and an anode to an aqueous solution 10. In FIG. 1 the step of providing a reference electrode to the aqueous solution 12 occurs after the step of providing a cathode and an anode to an aqueous solution 10. The step of regenerating said noble metal and/or said toxic heavy metal 16 occurs after the step of applying an absolute potential to said cathode 14. Hence, the regeneration of the noble metal and/or the toxic heavy metal occurs after the formation of the alloy.

The reference electrode which is provided is used to control the absolute potential of the cathode.

The regeneration of said noble metal results in a possibility to re-use the cathode. Hence, after the step of regeneration of said noble metal and/or said toxic heavy metal, the method may be conducted once again with the same cathode. Stated differently, if the method is conducted repeatedly the cathode being provided in the step of providing a cathode and an anode to an aqueous solution 10 may be the same cathode being re-used.

Figure 2:
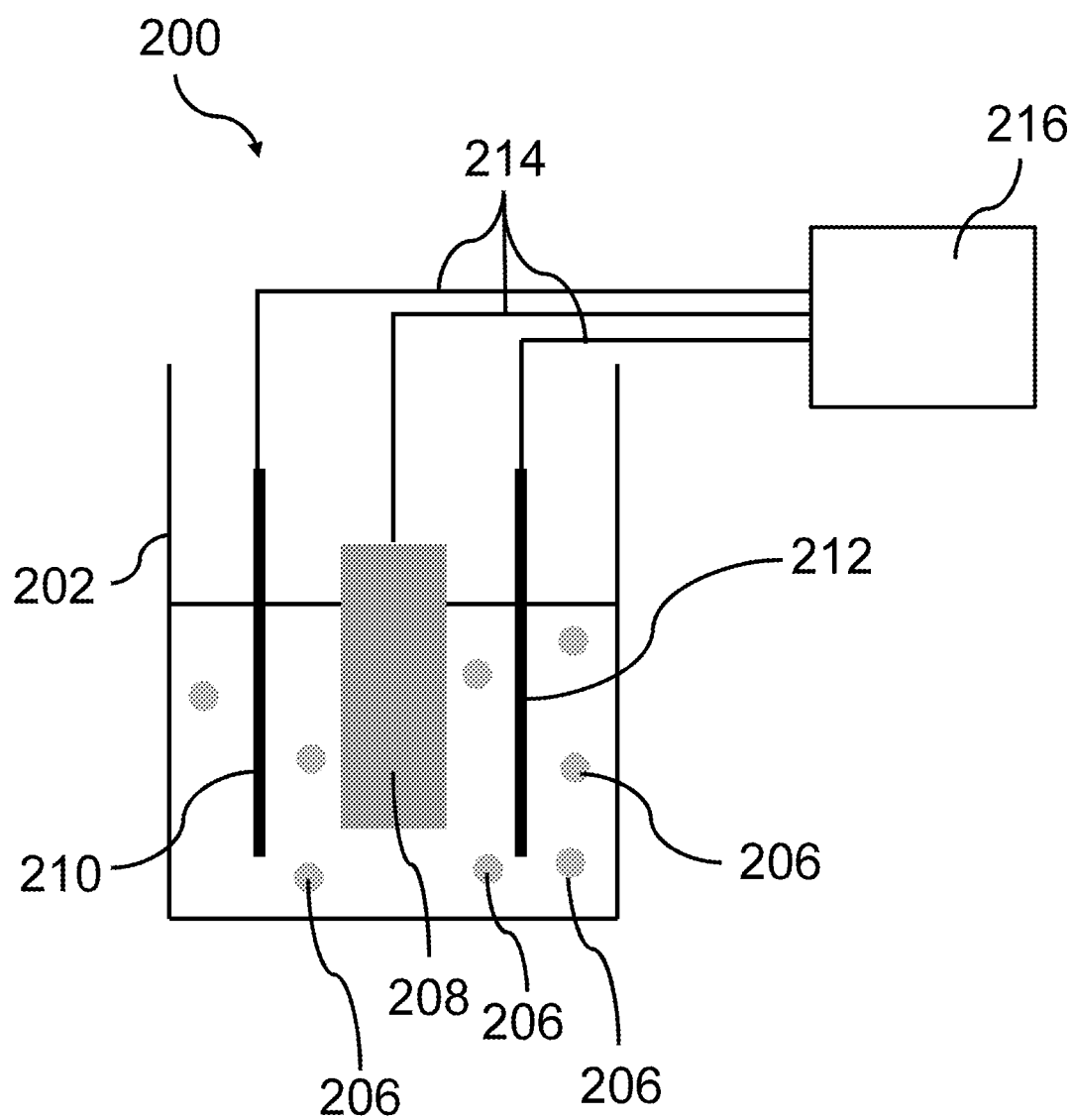
FIG. 2 shows a schematic view of an experimental set-up containing an aqueous solution in accordance with at least one embodiment of the invention.

FIG. 2 shows a schematic view of an experimental set-up 200. The experimental set-up comprises a beaker 202 holding an aqueous solution 204. The aqueous solutions comprised ions 206 of at least one toxic heavy metal. Further, the experimental set-up 200 comprises three electrodes: a cathode 208, an anode 210 and a reference electrode 212. The electrodes, i.e. the cathode 208, the anode 210 and the reference electrode 212 are connected with electrical connections 214, e.g. wires, to a power source 216 and to a controller (not shown in FIG. 2). This experimental set-up 200 may be used for electrochemical purification of an aqueous solution.

Figure 3:
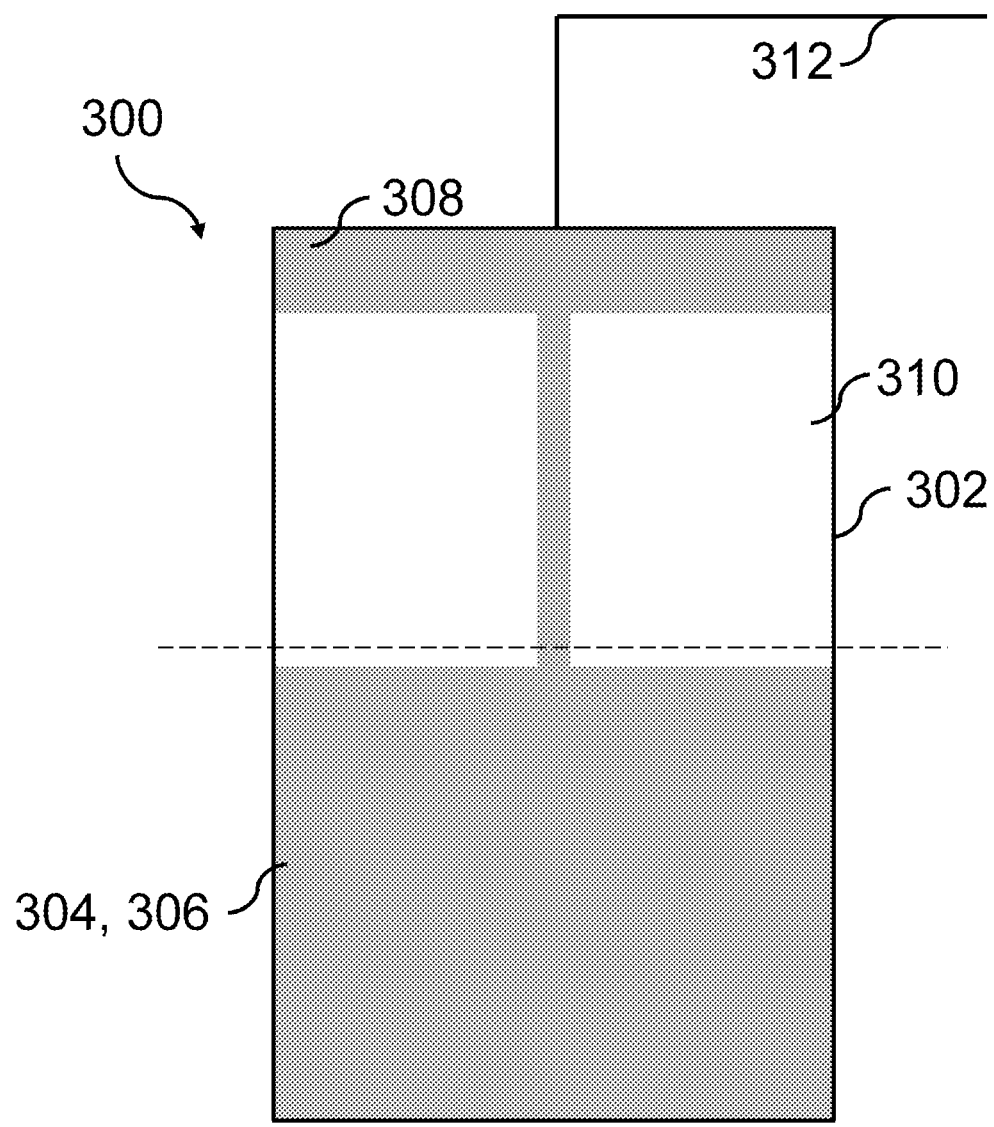
FIG. 3 shows a schematic view a cathode in accordance with at least one embodiment of the invention.

FIG. 3 shows a schematic view of a cathode 300. The cathode 300 may for example be the same as the cathode 208 in FIG. 2, but it may also be any other cathode in accordance with at least one embodiment of the invention. The cathode comprises an outer surface 302. Here, the outer surface 302 is a surface of a rectangular piece of polished fused silica. The outer surface 302 comprises an activable portion 304 which comprises a noble metal 306, e.g. platinum, and a non-activable portion 310. Further, the cathode 300 comprises a narrow metal channel 308 which is used for connecting the cathode 300 to a power source (not shown in FIG. 3). The cathode 300, when in use, may be connected to the power source by means of electrical connections 312, e.g. wires. The cathode may further comprise a primer layer (not shown) comprising a metal different from the noble metal 306 comprised in said outer layer 304.

When in use, the cathode is provided to an aqueous solution, e.g. to the aqueous solution 204 in FIG. 2. The dashed line crossing the cathode 300 in FIG. 3 indicates the level of the aqueous solution. Hence, the activable portion 304 of the outer surface is here totally immersed in the aqueous solution.

In the following, non-limiting examples of how the method may be conducted are presented. In other words, the following, non-limiting examples describes how the method may be used. Further, in the following, non-limiting examples, results of the method are presented. It should be understood that the man skilled in the art would realize that there are a number of modifications which may be possible without departing from the scope of the invention.

EXAMPLES

Cathode Preparation

Rectangular polished fused silica glass pieces (15 mm×30 mm×0.5 mm) were cleaned under sonication, first with acetone, then isopropanol, and finally with pure water (15 min. for each step). A 3 nm primer layer of titanium metal was deposited on one of the sides using physical vapor deposition (Lesker PVD 225). A second platinum metal layer with a thickness of 100 nm was deposited on top of the titanium primer, using the same technique. The geometry of the metal layer may for example be as schematized in FIG. 3. Hence, the cathode prepared as described in this paragraph may for example be the cathode 300 of FIG. 3. The area of the activable portion, i.e. the area of the metal layer, immersed in, i.e. provided to, an aqueous solution was approx. 15 mm×15 mm (2.25 cm2), and the electrical contact was done through a narrow deposited metal channel connecting this area.

Chemicals, Methods and Materials

The investigated aqueous solutions were prepared by mixing adequate amounts of pure water (MilliQ, Millipore, >18 MΩ/cm), high purity nitric acid (65%, Suprapur, Merck) and metal standard solutions (1000 mg/L, Ultra Scientific Analytical Solutions, water and dilute nitric acid matrix). The aqueous solutions were titrated with sodium hydroxide (0.1 M, Titrisol, Merck) to determine their acidity. Their pH was also measured with a pH meter. Where needed, e.g. pH dependency investigations, the ionic strength was kept constant by addition of sodium nitrate.

For each electrochemical study, 50 mL electrolyte was used. In other words, 50 mL of an aqueous solution was to be purified using the method according to the first aspect of the invention. Platinum wire was used as anode, and a $Hg/Hg_2SO_4$ electrode was used as reference electrode (E=0.68 vs. NHE) (SI Analytics). A potentiostat (Gamry, Reference 600) was used to control the current/potential and acquire electrochemical data. The cathodes were washed with isopropanol, then with pure water, followed by cyclic voltammetry in 0.5 M sulfuric acid solution between 0 and 1.4 V vs. RHE. A final washing with pure water was done to assure a clean surface prior to conducting the decontamination experiments, i.e. prior of conducting the method according the first aspect of the invention. All investigations were performed at ambient temperature, 20±1° C.

Blank experiments were initially performed. For these, clean platinum comprising cathodes and cathodes already loaded with some mercury were provided to mercury-containing solutions for several days, to see if alloy formation occurs in the absence of electrical potential. Electrochemical decontamination studies followed, using an absolute potential of 0.18 V vs. RHE. In other words, in the step of applying an absolute potential to said cathode (e.g. step 14 of FIG. 1, an absolute potential of 0.18 V vs. RHE was applied to the cathode. The influence of time (0-234 h), pH (0-6.6), and initial mercury concentration in solution (0.05-20 mg/L) on the efficiency of the method was investigated. Saturation of the cathode was investigated using an electrolyte containing 75 mg/L mercury, above the stoichiometric amount needed to convert all the platinum into mercury alloy. The electrochemical behavior of other cations in the aqueous solution was studied using a 1 M nitric acid electrolyte containing 10 mg/L of each mercury, calcium, magnesium, manganese, sodium, nickel, cadmium, copper, lead and zinc, and 20 mg/L iron.

Regeneration of the cathodes was done by immersing them into 1 M nitric acid solution and applying a current of 40 µA. Regenerated cathodes were again provided to an aqueous solution for conducting the method according to the first aspect again, followed by another regeneration step in pure acidic solution, to assess their re-use.

The metal concentration in the aqueous solution was monitored by sampling the aqueous solution before, during and after electrochemical treatment, and analyzing the aliquots collected using Inductively Coupled Plasma-Mass Spectrometry (ICP-MS) (iCAP Q, Thermo Fischer). In other words, the aliquots were collected before, during, and after conducting the method according to the first aspect of the invention.

The cathodes were investigated before and after conducting the method according to the first aspect of the invention using X-Ray Diffraction (XRD) (Siemens Diffraktometer D5000) and Scanning Electron Mycroscopy/Energy Dispersive Spectroscopy (SEM/EDS) (FEI Quanta 200F/Oxford Inca 300 EDS System).

Results and Discussion

In the absence of an applied electrical potential, the formation of platinum-mercury alloys was not noticed. Clean platinum cathodes and cathodes loaded with mercury (25% of the $PtHg_4$ stoichiometric saturation limit) provided to 1 M nitric acid comprising 10 mg/L mercury did not lead to a decrease of mercury content in solution, nor to any increases of platinum. This confirmed the stability of the platinum layer, as well as that of the alloy layer formed during electrochemical treatment.

Figure 4:
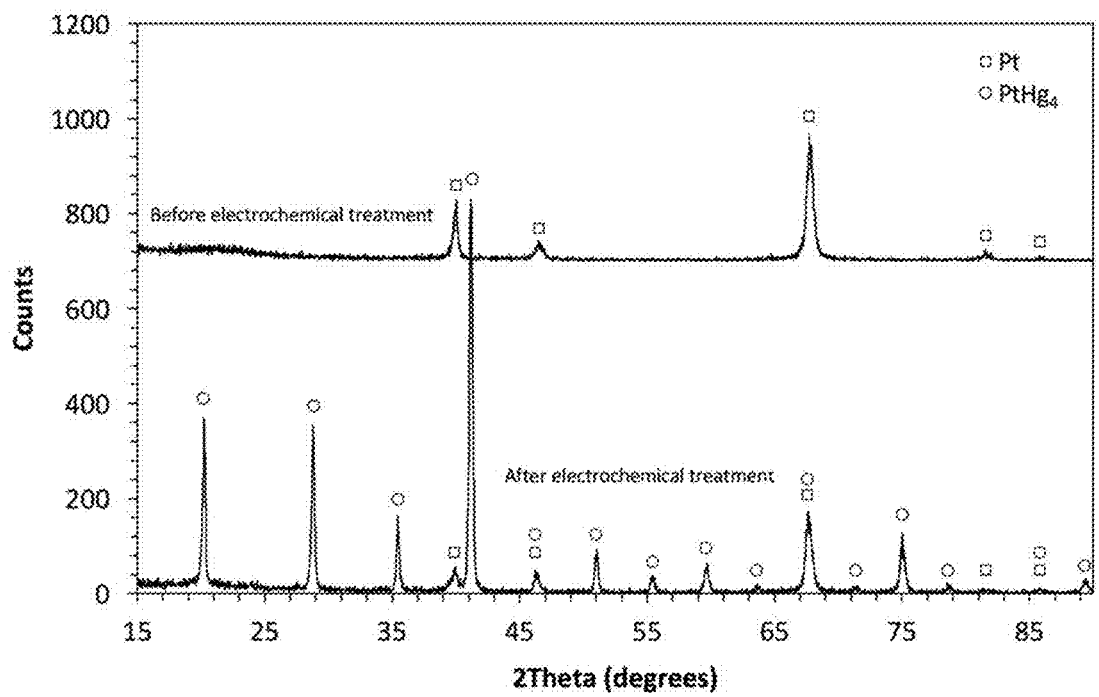
FIG. 4 shows an x-ray diffraction pattern of a platinum film covering a cathode before and after electrochemical treatment in accordance with at least one embodiment of the invention.

FIG. 4 shows a graph comprising two x-ray diffraction (XRD) patterns of the activable portion of a cathode before (top pattern) and after (bottom pattern) the step of applying an absolute potential of 0.18 V vs. RHE to said cathode, e.g. the step 14 of FIG. 1. Stated differently, the top pattern is collected when measuring the activable portion, comprising a layer of clean platinum, of the cathode prior the electrochemical treatment and the bottom pattern is collected when measuring the activable portion, comprising a $PtHg_4$ alloy, after electrochemical treatment.

In the XRD pattern shown in FIG. 4, peaks associated to clean platinum are marked with a square, whereas peaks associated to $PtHg_4$ is marked with a circle. The top pattern shows no peaks which is associated with the alloy, whereas the top pattern shows that the alloy $PtHg_4$ has indeed be formed upon the step applying an absolute potential to said cathode. Hence, XRD analysis of the metallic layer before and after electrochemical treatment revealed the formation of $PtHg_4$ (FIG. 4). The incorporation of mercury atoms and the re-arrangements of atoms affect the structure of the film. Upon alloying, a porous structure is formed, and a thickening of the film was noted down.

Figure 5:
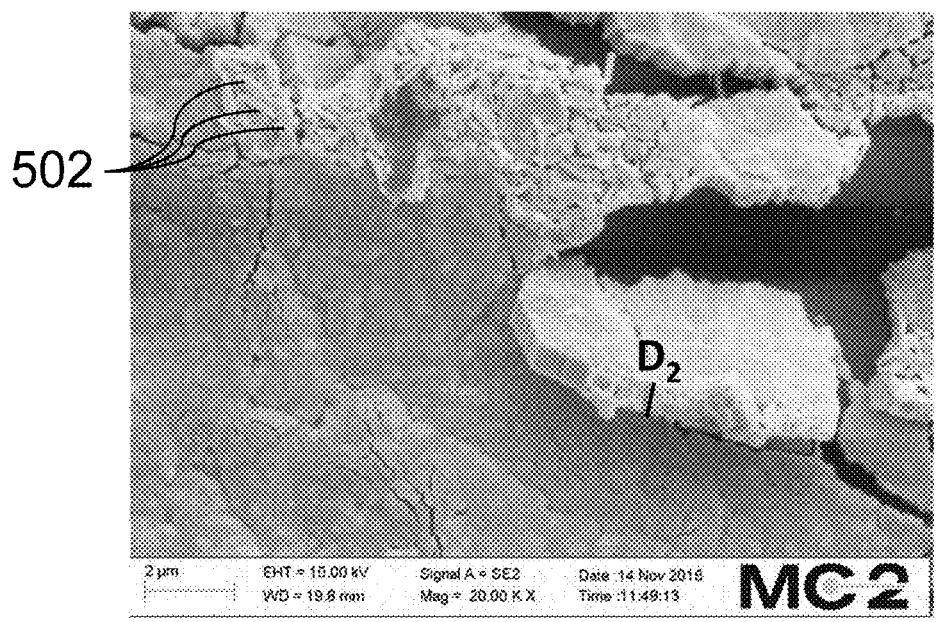
FIG. 5 shows a SEM micrograph of an alloy layer in accordance to at least one embodiment of the invention.

FIG. 5 shows a SEM-micrograph of an electrode after complete alloy formation (saturated Pt-film). The thickness of the alloy layer is approximated from this micrograph by measuring at two different positions in an area where the film was damaged and parts of it has lost contact with the support. At the first position, fragments 502 of the film laying on the alloy surface is measured to be about 750 nm. At the second position, indicated as D2 in FIG. 2, the side of a flake of the alloy film was measured to be 650 nm. However, as the side of the flake measured at D2 is not perfectly aligned to the normal of the electron beam, D2 is likely to be an underestimation of the alloy film thickness. Here, the thickness of the platinum layer of the outer surface was 100 nm prior to applying an absolute potential to said cathode. If all mercury ions present in the aqueous solution prior applying an absolute voltage to said cathode forms an alloy with said platinum, the alloy layer may theoretically be 760 nm.

Figure 6:
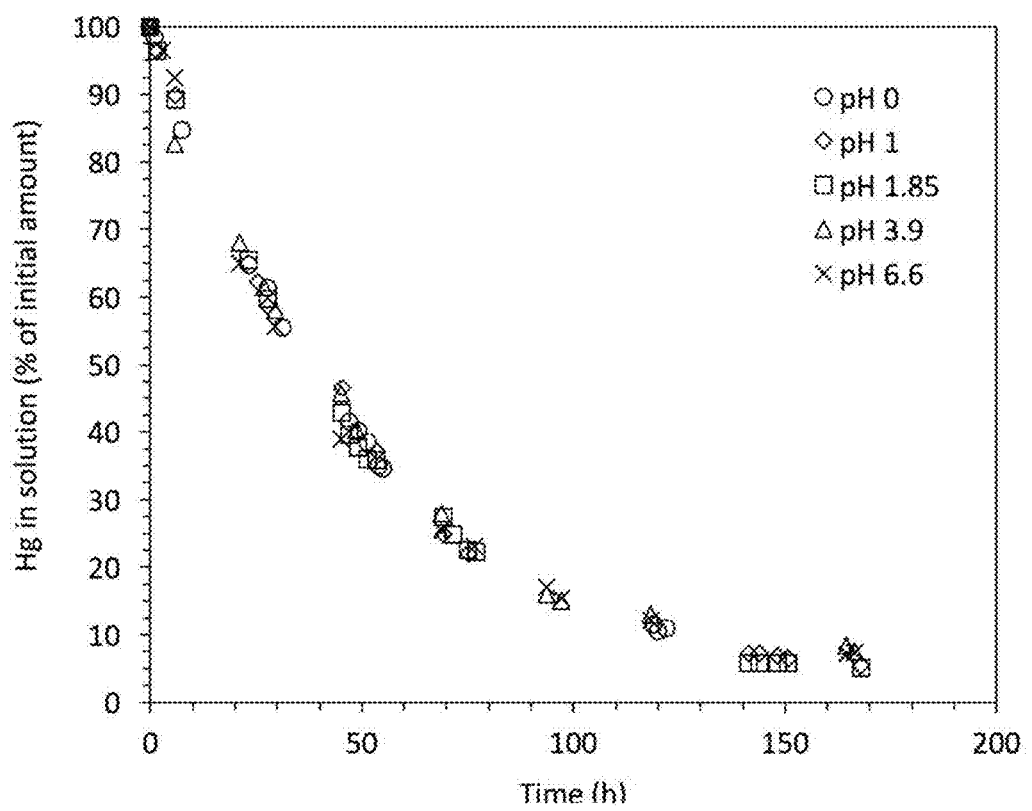
FIG. 6 shows a graph showing the influence of pH on the decrease of mercury concentration in accordance with at least one embodiment of the invention.

FIG. 6 shows a graph showing the influence of pH on the decrease of mercury concentration. On the x-axis time (hours) is shown, whereas on the y-axis the concentration of mercury in the aqueous solution (%) is shown. Different pH, ranging from pH 0 to pH 6.6, were tested. Stated differently, the pH of the aqueous solutions to be purified by the method as described herein ranged from 0 to 6.6. The start concentration of mercury in the aqueous solution, i.e. when the concentration of mercury was 100%, was 10 mg/L.

Upon applying an electrical potential of 0.18 V vs. RHE, the mercury concentration in solution started to decrease as seen in the FIG. 6. The pH of the aqueous solution did not affect the process in the pH range 0-6.6.

The kinetics of the process were rather slow under the investigated conditions, approx. 168 h being needed to decrease the contamination of solutions containing 10 mg/L mercury by 95%. The decrease appears to be faster in the beginning (in the range of 35-40 h for 50% decontamination efficiency; FIG. 6).

Figure 7:
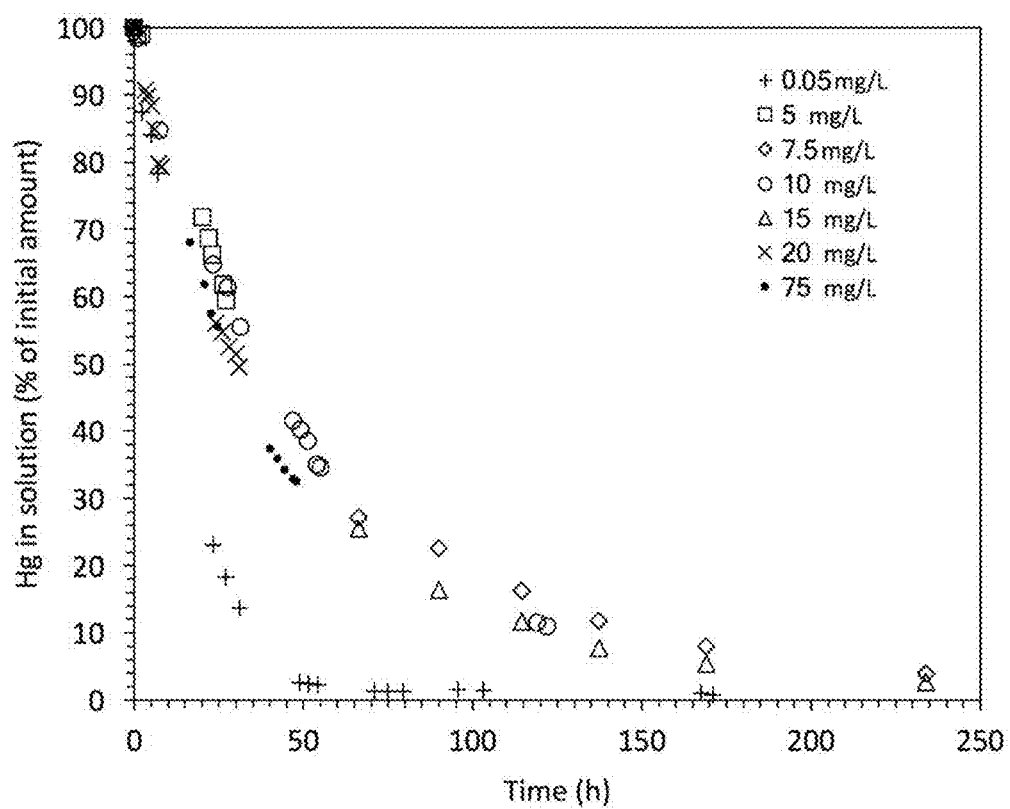
FIG. 7 shows a graph showing the influence of start concentration of mercury on the efficiency of the purification of the aqueous solution in accordance with at least one embodiment of the invention.

FIG. 7 shows a graph showing the influence of starting concentration (mg/L) on the decrease of mercury concentration. On the x-axis time (hours) is shown, whereas on the y-axis the concentration of mercury in the aqueous solution (%) is shown. Different starting concentrations, ranging from 0.05 mg/L to 75 mg/L, were tested. Stated differently, the starting concentration of mercury in the aqueous solutions to be purified by the method as described herein ranged from 0.05 mg/L to 75 mg/L. The pH of the aqueous solutions was 0.

Mercury concentration in solution plays an important role in the design of decontamination/purification technologies. It is desired that processes are efficient in a wide range of concentrations, and effective decontamination/purification efficiencies are obtained at low and high levels of mercury, alike.

About 35-40 h were needed to reduce the mercury content by 50% in the solutions containing between 5-75 mg/L mercury. For more diluted solutions, e.g. 0.05 mg/L, the process was faster and over 75% of the mercury was incorporated into the electrode in 24 h These experiments/examples show that the method as described herein may be used to decrease the concentration of mercury ions in an aqueous solution to such low values (<0.4 µg/L here, after starting with 0.05 mg/L mercury) and therefore the method may be used for purification of aqueous solutions below the limit for mercury concentration in potable water, e.g. 1 µg/L within the European Union. Hence, the method may be exploited to purify water to drinking standards.

Figure 8:
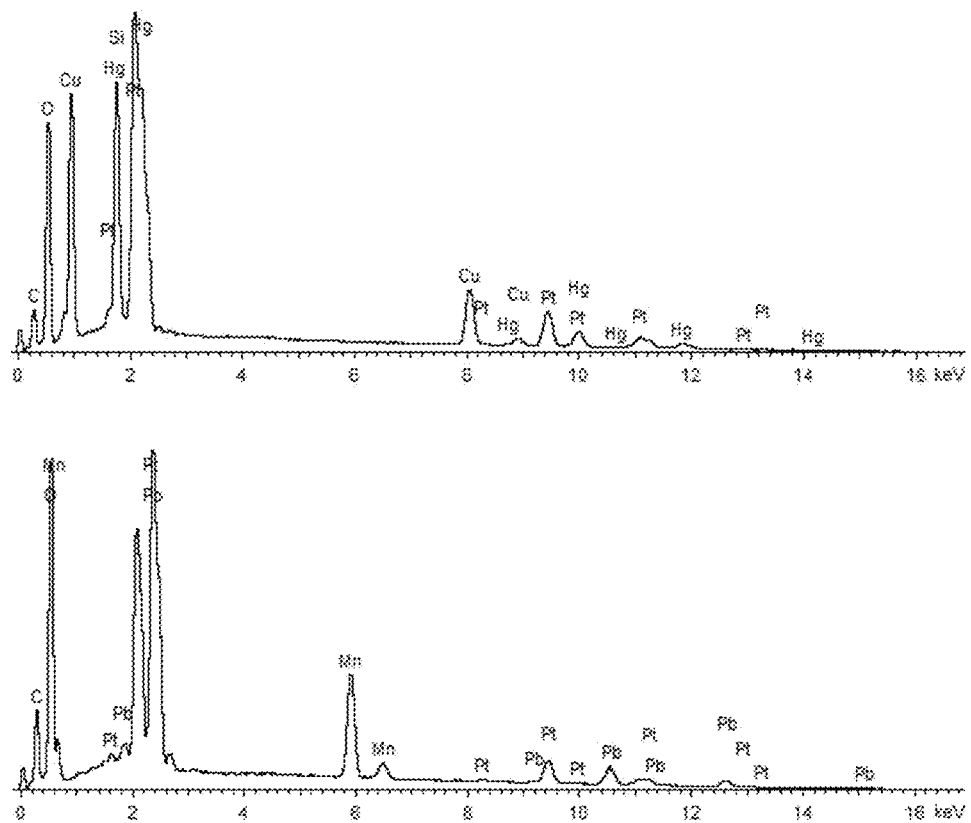
FIG. 8 shows a EDS spectra of a cathode and an anode in accordance with at least one example embodiment of the invention.

FIG. 8 shows EDS spectra of a cathode (top) and an anode (bottom) after electrochemical purification of a 1 M nitric acid aqueous solution comprising 10 mg/L of mercury, calcium, magnesium, sodium, nickel, cadmium, copper, lead and zinc, respectively, and 20 mg/L of iron. The step of applying an absolute potential to said cathode did here last 7 days. During these days the mercury content in the aqueous solution decreased significantly (>90% efficiency, hence 90% of all mercury ions was incorporated in the alloy after the 7 days). The alloy formed on the cathode were $PtHg_4$ in a similar manner which has been shown above for solutions where no other metal ions besides mercury ions were comprised in the aqueous solution. No change in concentrations of calcium, magnesium, sodium, nickel cadmium zinc and iron was noticed. The copper concentration decreased with approx. 40% and the EDS spectrum of the cathode revealed presences of copper on the cathode. Further, the manganese and lead concentrations decreased with approx. 10% and 70% respectively and the EDS spectrum of the anode revealed that these metals have been incorporated in a surface layer of the anode which was also confirmed by a change in colour of the anode.

Figure 9:
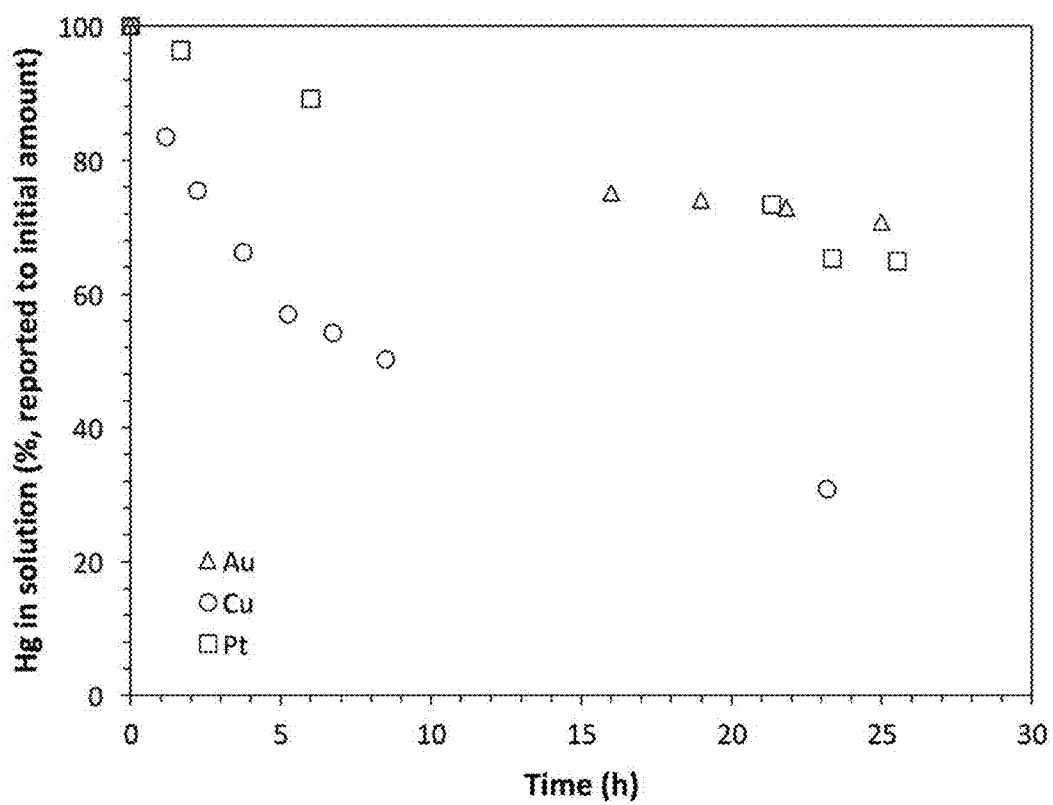
FIG. 9 shows the decrease of mercury concentration when using different noble metals in accordance with at least one example embodiment of the invention.

FIG. 9 shows the decrease of mercury in an aqueous solution as a function of time when using three different cathodes comprising gold (triangles), copper (circles), and platinum (squares). The starting concentration of mercury for these experiments was 10 mg/L.

Figure 10A:
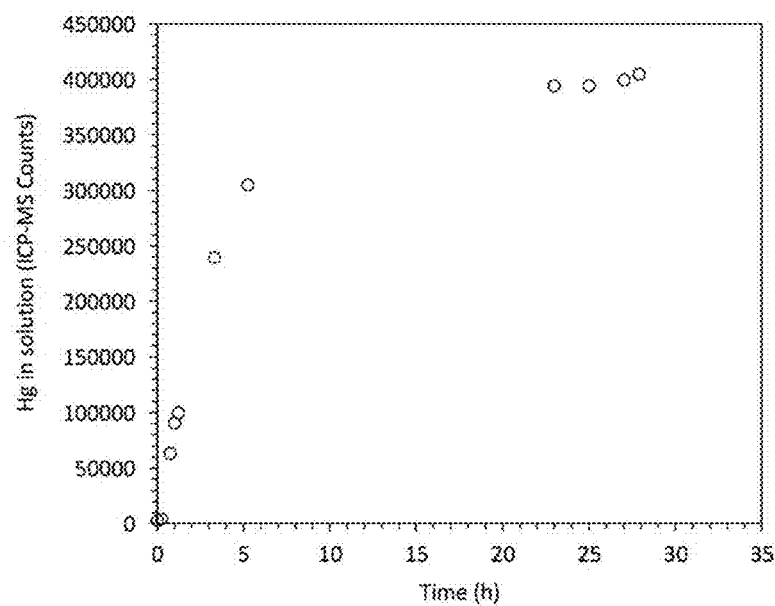
FIG. 10a shows a graph showing increase of mercury concentration in an aqueous solution upon regeneration of a cathode in accordance with at least one example embodiment of the invention.

FIG. 10a shows how the concentration of mercury increases during regeneration of a cathode, which cathode has previously been used for purification of an aqueous solution where $PtHg_4$ has been formed on the outer surface of cathode. To regenerate the cathode a reverse current may be applied to the system. The mercury which has been incorporated in the alloy can be brought back to a clean aqueous solution, i.e. an aqueous solution which to not comprise mercury ions. The clean aqueous solution may be of a significantly smaller volume as compared to the volume of the aqueous solution which has previously been purified by the method as presented herein, which means that this aqueous solution of a smaller volume may easier be contained or processed. FIG. 10a shows the increase in concentration of mercury ions in a 1 M $HNO_3$, aqueous solution after applying a 40 µA current to the cathode comprising $PtHg_4$. More than 95% of the mercury was regenerated.

Figure 10B:
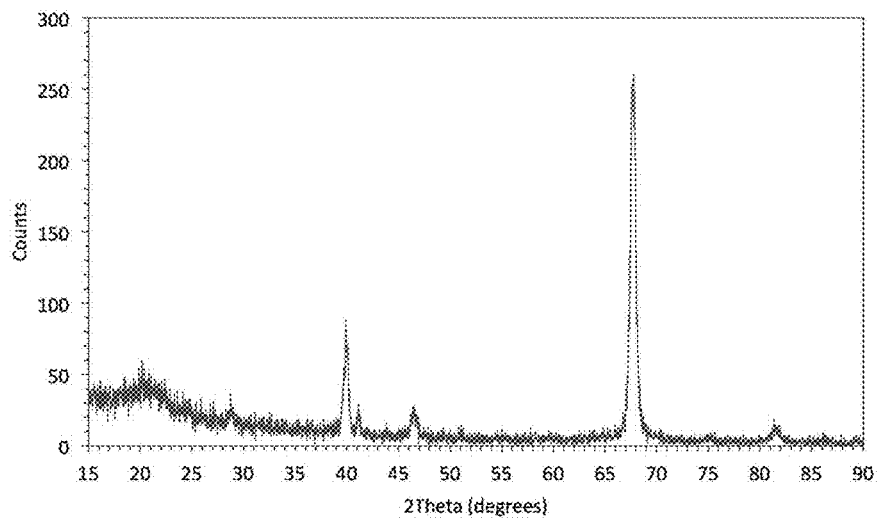
FIG. 10b shows the XRD spectrum of the regenerated cathode.

FIG. 10b shows an XRD spectrum of the regenerated electrode. When compared to the XRD spectra of FIG. 4, it is clear that the major phase in the cathode after regeneration becomes, again, platinum. Re-use of a regenerated cathode in a purificiation process of an aqueous solution comprising 10 mg/L mercury shows a similar efficiency as when using the same cathode for the first time.

The invention claimed is:

1. A method for electrochemical purification of an aqueous solution comprising the steps of:
    providing a cathode and an anode to an aqueous solution, wherein said aqueous solution comprises soluble ions of at least mercury and wherein said cathode comprises an outer surface, which outer surface comprises platinum;
    applying an absolute potential to said cathode; and
    removing mercury ions from the aqueous solution by forming an alloy comprising mercury and platinum at the outer surface of the cathode via the absolute potential provided to the cathode.

2. The method according to claim 1, wherein said outer surface comprises said noble metal in the form of a continuous layer or in the form of particles.

3. The method according to claim 1, wherein said method further comprises a further step:
providing a reference electrode;
wherein said reference electrode is used to control said absolute potential of said cathode.

4. The method according to claim 1, wherein said absolute potential of said cathode is within the range of −1-1.5 V vs. RHE, or within the range of 0-1 V vs. RHE.

5. The method according to claim 1, wherein the aqueous solution comprises at least one metal ion in addition to mercury, and wherein only the alloy comprising platinum and mercury is formed at the cathode on application of the absolute potential.

6. The method according to claim 1, wherein said alloy layer has a thickness within the range of 1 nm to 1 cm.

7. The method according to claim 1, wherein said alloy layer has a thickness within the range of 1 nm to 1 mm.

8. The method according to claim 1, wherein said aqueous solution has a pH within the range of −1-14.

9. The method according to claim 1, wherein said aqueous solution has a pH within the range of −1-10.

10. The method according to claim 1, wherein said aqueous solution has a pH within the range of −1-7.

11. The method according to claim 1, wherein a concentration of said ions of mercury in said aqueous solution is within the range of 0.001 mg/L-1000 mg/L.

12. The method according to claim 1, wherein a concentration of said ions of mercury in said aqueous solution is within the range of 0.001 mg/L-500 mg/L.

13. The method according to claim 1, wherein a concentration of said ions of mercury in said aqueous solution is within the range of 0.01 mg/L-100 mg/L.

14. The method according to claim 1, wherein said method further comprises a step:
regenerating the platinum on the outer surface of the cathode by releasing mercury ions into solution.

15. Method for electrochemical purification of an aqueous solution according to claim 1, wherein said method is used for electrochemical purification of an aqueous solution comprising soluble ions of at least one toxic heavy metal; and
wherein said aqueous solution is artificial aqueous solution or a natural aqueous solution.

16. Method for electrochemical purification of an aqueous solution according to claim 15, wherein said aqueous solution is industrial waste water.

17. Method for electrochemical purification of an aqueous solutions according to claim 15, wherein said aqueous solution is a sewage.

18. Method for electrochemical purification of an aqueous solution according to claim 15, wherein said aqueous solution is potable water and/or household water.

19. The method according to claim 14, wherein mercury ions are released into a separate aqueous solution, which does not comprise mercury ions prior to regeneration.

20. The method according to claim 1, wherein the alloy comprising mercury and platinum formed at the outer surface of the cathode is $PtHg_4$.

* * * * *